Dec. 22, 1931.  C. W. GARDNER  1,837,539

LUGGAGE CARRIER

Filed April 26, 1928

INVENTOR.
Charles W. Gardner
BY
Wm Badge ATTORNEY.

Patented Dec. 22, 1931

1,837,539

UNITED STATES PATENT OFFICE

CHARLES W. GARDNER, OF NEW YORK, N. Y.

LUGGAGE CARRIER

Application filed April 26, 1928. Serial No. 273,038.

The present invention relates to luggage carriers designed to be used as strap-holder attachments for securing suitcases and like baggage to the running-board of automobiles.
The objects of the invention include means for detachably connecting the straps to the attachment members and securing the baggage thereby in position, and when not in use to remove the straps from the attachments and to present for the latter a substantially smooth upper surface with respect to the face of the running-board.

The invention further includes means for conveniently applying the straps to the attachments and to provide therefor multiple resisting members adapted to withstand the extreme tension thereof necessary for securing the baggage in position.

For further comprehension of the invention, and of the objects and advantages thereof, reference is had to the following description and accompanying drawings, and to the appended claims in which the various features of the invention are more particularly pointed out.

Referring to the drawings in which similar characters of reference designate like parts throughout the several views:

Figure 1 of the drawings is a ground plan view of an attachment showing the parts thereof assembled.

Figure 1:
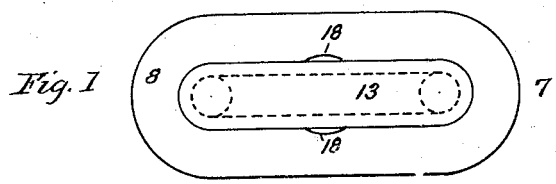
Figure 2:
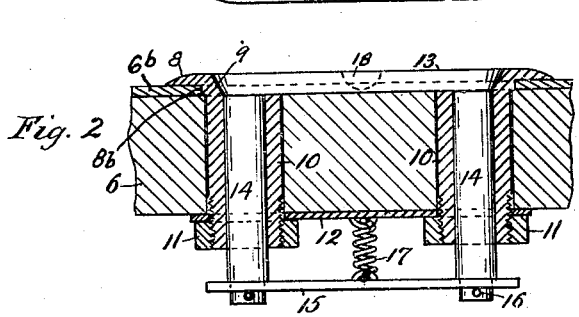
Figure 2 is a lengthwise elevational view showing an attachment socket and the running-board in section and a strap-holder member mounted therein, the latter shown in full lines.

As shown in Fig. 2, the running-board is indicated by the numeral 6, to which is connected the attachment sockets, indicated generally by 7, each of the sockets having an upper flange member 8 provided with a countersunk recess 9 having outwardly tapering side and end walls. A pair of tubular legs 10 are integrally formed with the upper flange member, and at their lower or free ends the legs are provided with screw-threads engaged by nuts 11. The legs 10 pass through perforations formed in the running-board 6, and the socket is secured in position thereon by the nuts 11, a bearing plate 12 having perforations to receive the legs being preferably provided and interposed between the nuts and the bottom of the board for distributing the tension of the nuts and locking the socket in position.

Figure 3:
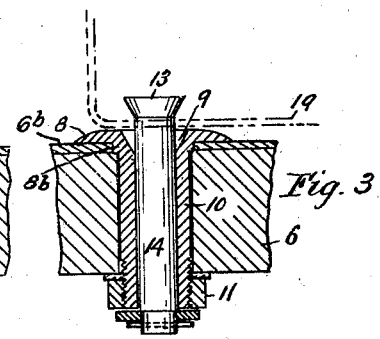
Figure 3 is a transverse sectional view of the socket and running-board, showing the strap-holder in raised position to receive the strap, fragmentally indicated in dotted lines.
Figure 5:
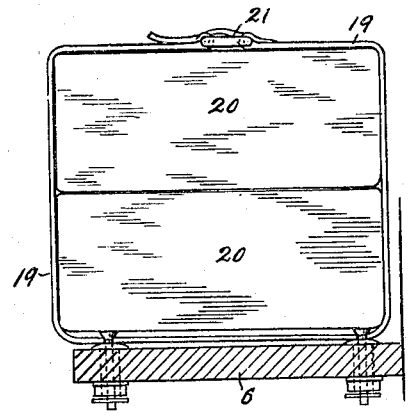
Figure 5 is an elevational end view showing a running-board in section with baggage strapped thereon.

Vertically movable within the attachment sockets 7 is a strap-holder consisting of an upper strap-plate 13 having its marginal edges tapered inwardly to conform with the countersunk recesses in the sockets and into which the strap-plates are disposed to enter and present therewith alined upper surfaces. Projecting downwardly from the strap-plate are a pair of arms 14 adapted to slidably engage the bore of the tubular legs 10, the lower or free ends of the arms having reduced shouldered portions engaged by the perforated ends of the tie-bar 15, pins 16 extending through the outer ends of the arms and serving as stops for the tie-bar to limit the upward movement of the strap-holder. A compression spring 17 is interposed between the bearing plate 12 and the tie-bar 15 and serves to downwardly thrust the strap-holder and urge the strap-plate 13 into the recess formed in the socket member 8 and thus close the attachment. Disposed on opposite side faces of the recessed portion 9 of the upper flange members 8 of the attachment sockets are a pair of grooves 18 that extend into the upper surfaces of the members and provide spaces extending below the beveled edges of the upper plate 13 of the strap holders, and into which spaces any convenient tool, as the blade of a screwdriver, may be inserted and the holder raised or opened in opposition to the spring 17. The holder may then be held open by the operator and the straps 19, indicated in dotted lines in Fig. 3, passed under the top plate 13 and between the arms 14. As shown in Fig. 5 a pair of holders are used for each strap 19 and the latter may be passed around one or more articles of baggage, shown at 20, and secured by the buckles 21 to the running board 6. Two straps and two sets of holder attachments are usually employed for holding the baggage in position and resisting the considerable tendency toward displacement due to the rapidly moving vehicle, the stresses occasioned thereby being fully met by the double arm strap-holder attachments. Also, as shown in Figs. 2 and 3, the running board 6 is provided with a renewable top facing 6b of any approved material and formed with apertures adapted to receive the attachment sockets 7, the flange members 8 of the latter being provided with double clamping faces, disposed one above the other in offset relation, and forming shoulders 8b adapted to lie within and extend around the inner marginal edges formed by said apertures, said lower and upper clamping faces being adapted respectively to engage the top surfaces of the running board 6 and the renewable top facing 6a and be clamped thereto by the nuts 11.

Figure 4:
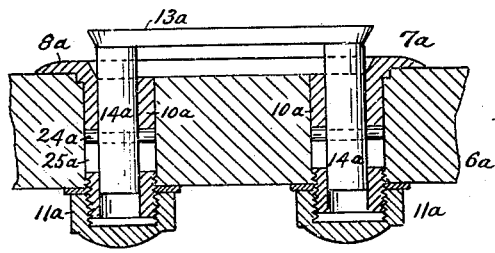
Figure 4 is an elevational view, partially in section, of a modified form of strap-holder attachment.

In Fig. 4 is shown a modified form of attachment having the socket 8a provided with the double leg members 10a passing through the running board 6a and secured thereto by the cap nuts 11a having closed outer ends. The upper strap-plate 13a is provided with the double arms 14a, each thereof having stop-pins 24a extending therethrough and slidably engaging slots 25a formed in the legs 10a. By means of the stop-pins 24a the holder may be raised the necessary amount for the introduction of the straps, and the cap nuts 11a provide against the admission from below of foreign matter into the working parts of the holder.

I claim:

1. An attachment of the class described comprising a socket provided with a pair of tubular legs, a recessed seat formed in the upper end of said socket between said tubular legs, screw-threads formed on the lower ends of said legs, lock-nuts engaging the threaded ends of said legs, a bearing plate slidable on said legs and engaged by said nuts, a strap-holder provided with a pair of arms vertically slidable in the tubular legs of said socket, a strap-plate connecting the arms together at their upper ends and adapted to engage the recessed seat of said socket, a tie-bar detachably fixed to said arms at their lower ends, and yielding means disposed between said bearing plate and tie-bar and normally serving to seat said strap-plate.

2. An attachment of the class described comprising a socket provided with a pair of tubular legs, a recessed seat formed in the upper end of said socket between said tubular legs, screw-threads formed on the lower ends of said legs, lock-nuts engaging the threaded ends of said legs, a bearing plate slidable on said legs and engaged by said nuts, a strap-holder provided with a pair of arms vertically slidable in the tubular legs of said socket, a strap-plate connecting the arms together at their upper ends and adapted to engage the recessed seat of said socket, a tie-bar detachably fixed to said arms at their lower ends, yielding means disposed between said bearing plate and tie-bar and normally serving to seat said strap-plate, and means for raising said strap-plate from its seat against the action of said yielding means.

3. In a running board, a top facing therefor formed with an aperture, a strap-holder attachment including a socket member extending through said running board and aperture, a flange member outwardly projecting from the upper portion of said socket member and provided with a clamping face arranged to engage in overlapping relation the upper surface of said running board, and means engaging the lower surface of said running board for securing said socket member in place.

4. In a running board, a top facing therefor formed with an aperture, a strap-holder attachment including a socket member extending through said running board and aperture, a flange member outwardly projecting from the upper portion of said socket member and provided with double clamping faces disposed one above the other, the lower of said clamping faces being arranged to engage in overlapping relation the upper surface of said running board, and the upper of said clamping faces arranged to engage in overlapping relation the top facing of said running board, and means engaging the lower surface of said running board for securing said socket member in place.

5. In a running board, a top facing therefor formed with an aperture, a strap-holder attachment including a socket member extending through said running board and aperture, a flange member outwardly projecting from the upper portion of said socket member and provided with double clamping faces disposed to independently engage the upper surfaces of the running board and the top facing of the latter.

Signed at New York, in the county of New York and State of New York, this 23rd day of April, 1928.

CHARLES W. GARDNER.